United States Patent
Kuri et al.

(10) Patent No.: US 9,733,369 B2
(45) Date of Patent: Aug. 15, 2017

(54) NEUTRON MONITOR DEVICE AND NEUTRON MEASUREMENT METHOD

(71) Applicants: MITSUBISHI HEAVY INDUSTRIES MECHATRONICS SYSTEMS, LTD., Hyogo (JP); OSAKA UNIVERSITY, Osaka (JP)

(72) Inventors: Shuhei Kuri, Kobe (JP); Toshiharu Takahashi, Kobe (JP); Hiroshi Horiike, Suita (JP); Eiji Hoashi, Suita (JP); Isao Murata, Suita (JP); Sachiko Doi, Suita (JP)

(73) Assignees: MITSUBISHI HEAVY INDUSTRIES MECHATRONICS SYSTEMS, LTD., Hyogo (JP); OSAKA UNIVERSITY, Osaka (JP)

( * ) Notice: Subject to any disclaimer, the term of this patent is extended or adjusted under 35 U.S.C. 154(b) by 0 days.

(21) Appl. No.: 15/317,512

(22) PCT Filed: Jun. 12, 2015

(86) PCT No.: PCT/JP2015/067048
§ 371 (c)(1),
(2) Date: Dec. 9, 2016

(87) PCT Pub. No.: WO2015/190603
PCT Pub. Date: Dec. 17, 2015

(65) Prior Publication Data
US 2017/0115408 A1    Apr. 27, 2017

(30) Foreign Application Priority Data
Jun. 13, 2014   (JP) .................................. 2014-122912

(51) Int. Cl.
*G01T 3/00* (2006.01)

(52) U.S. Cl.
CPC ...................................... *G01T 3/00* (2013.01)

(58) Field of Classification Search
CPC ................ G01T 3/08; G01T 3/00; G01T 7/00
See application file for complete search history.

(56) References Cited

U.S. PATENT DOCUMENTS

| | | | | |
|---|---|---|---|---|
| 3,792,280 A | * | 2/1974 | Piltingsrud | G01T 3/00 250/390.03 |
| 5,278,417 A | * | 1/1994 | Sun | G01T 3/00 250/390.03 |

(Continued)

FOREIGN PATENT DOCUMENTS

JP    2002-311147 A    10/2002

OTHER PUBLICATIONS

Written Opinion in PCT/JP2015/067048, mailed Jul. 7, 2015.
(Continued)

*Primary Examiner* — Marcus Taningco
(74) *Attorney, Agent, or Firm* — Hauptman Ham, LLP (57) ABSTRACT

Provided are a neutron monitor device and a neutron measurement method which make it easier to measure the intensity of the neutrons having the energy region of 10 KeV to several hundreds KeV. A neutron monitor device includes a first detector which includes a hemispherical first body formed of PE and having a radius of 31 mm, a first specimen containing GaN disposed at the center of the first body, a Cd layer provided on an outer surface of the first body, and a B layer provided inside the first body, and a second detector which includes a hemispherical second body formed of PE and having a radius of 27 mm, a second specimen containing GaN disposed at the center of the second body, a B layer provided on the outer surface of the second body, and a Cd layer provided inside the second body.

7 Claims, 6 Drawing Sheets (56) References Cited

U.S. PATENT DOCUMENTS

| | | | | |
|---|---|---|---|---|
| 5,578,830 | A * | 11/1996 | Olsher | G01T 3/00 250/390.03 |
| 6,362,485 | B1 * | 3/2002 | Joyce | G01T 3/00 250/370.05 |
| 6,426,504 | B1 | 7/2002 | Menlove et al. | |
| 7,655,921 | B2 * | 2/2010 | Fehrenbacher | G01T 3/00 250/390.03 |
| 9,013,102 | B1 * | 4/2015 | Wedding | H01J 47/12 250/374 |
| 9,442,202 | B2 * | 9/2016 | Tanner | G01T 3/00 |
| 9,529,101 | B2 * | 12/2016 | Tanner | G01T 3/00 |
| 2015/0001401 | A1 * | 1/2015 | Ramsden | G01T 1/20 250/362 |

OTHER PUBLICATIONS

Hideki Matsui, "Summary of International Fusion Materials Irradiation Facility (IFMIF) Plan", Institute for Materials Research, Tohoku University, Japan Atomic Energy Research Institute, 11th Nuclear Fusion Research and Development Problem Study Group, p. 14, Sep. 29, 2003.

International Search Report in PCT/JP2015/067048, mailed Jul. 7, 2015.

\* cited by examiner

NEUTRON MONITOR DEVICE AND NEUTRON MEASUREMENT METHOD

RELATED APPLICATIONS

The present application is a National Phase of International Application Number PCT/JP2015/067048, filed Jun. 12, 2015, which claims priority to Japanese Application Number 2014-122912, filed Jun. 13, 2014.

FIELD

The present invention relates to a neutron monitor device and a neutron measurement method for measuring neutrons, particular, the dose of epithermal neutrons.

BACKGROUND

Currently, a boron neutron capture therapy (BNCT) has attracted attention as a technique that is capable of selectively killing and treating cancer cells. In the BNCT, since it is required to utilize thermal neutrons and epithermal neutrons, there are many restrictions, for example, patients need to visit a reactor which can generate and utilize neutrons. Thus, a compact neutron generator capable of generating neutrons even in hospitals is desired. In the neutron generator, proton and deuteron accelerated in an accelerator are made to collide with target of beryllium or lithium.

As a conventional accelerator, an accelerator described in Non Patent Literature 1 has been known. The accelerator has a configuration in which an ECR (electron cyclotron resonance) type ion source, a radio frequency quadrupole linear accelerator (RFQ linac), and a drift tube type linear accelerator (DTL) are continuously provided. In the accelerator, the deuteron ions are accelerated up to 5 MeV by the RFQ linac and are accelerated up to 40 MeV by the DTL. Liquid lithium which flows over a curved back wall is irradiated with beam of the accelerated deuteron ions to generate neutrons behind the liquid lithium.

CITATION LIST

Non Patent Literature

Non Patent Literature 1: Summary of International Fusion Materials Irradiation Facility (IFMIF) Plan, Institute for Materials Research, Tohoku University, Japan Atomic Energy Research Institute, Hideki Matsui, 11th Nuclear Fusion Research and Development Problem Study Group, Sep. 29, 2003, page 14

SUMMARY

Technical Problem

When irradiating the patient with the epithermal neutrons, in order to prevent the irradiation of an excessive dose, it is necessary to estimate the dose of neutrons before the irradiation. In this case, neutrons of high-energy components exceeding 10 keV are particularly problematic since the biological effectiveness is high. However, at present, a simple and effective means for measuring the spectrum of the high-energy components of the neutrons is not established. In particular, there is a high demand for the measurement of the intensity of neutrons having energy of 10 keV to several hundreds keV. An object of the present invention is to develop a monitor that has sensitivity in the energy region and is capable of easily performing the intensity measurement of neutrons.

Solution to Problem

A neutron monitor device of a present invention includes a first detector which includes a first body including a spherical portion of a predetermined radius formed of a hydrogen-containing material, a first specimen containing Ga disposed at the center of the spherical portion, a Cd layer provided on an outer surface of the spherical portion, and a B layer provided around the first specimen, and a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer provided around the second specimen.

A neutron measurement method of the present invention includes placing the first detector and the second detector of the neutron monitor device according to the above-described invention in an irradiation region of neutrons, and after the irradiation of neutrons, measuring the neutron intensity (or the dose) from a difference in sensitivity between the first detector and the second detector.

In the first detector of the neutron monitor device, a Cd layer provided on an outer surface of the first body absorbs neutrons of very low energy that has not been removed by a B layer of the inner side. Thus, the incident neutrons near the heat do not affect the sensitivity characteristics of the neutron monitor. A Cd layer provided around (inside) the second specimen of the second body can eliminate the contribution of the incident neutrons of 100 eV or less. The reason is that, since the decelerated neutrons are thermalized in the body of the hydrogen-containing material having the radius (thickness) of approximately 30 mm, the sensitivity becomes zero.

Further, in the second detector, the B layer provided on the outer surface of the second body removes the region (A region in FIG. 7) in which a sensitivity difference between the first detector and the second detector is deflected to a negative side, by decreasing the neutrons of the intermediate energy or less. The B layer provided around (inside) the first specimen of the first body has the same function as the Cd layer for the incident neutrons of 100 eV or less, but lowers the sensitivity of the intermediate energy, and removes the vibration that is seen on the positive side of the sensitivity characteristics in the region of 10 keV or less that is left after the subtraction.

Further, the hydrogen-containing materials of the first detector and the second detector are made of PE, and it is possible to set each of the radius of the spherical portion of the first detector and the radius of the spherical portion of the second detector so that the peak sensitivities of the first detector and the second detector are shifted in the vicinity of a lower limit value of a desired sensitivity range. For example, in the first detector and the second detector, the radius of the hydrogen-containing material is set so that the peak sensitivities of the first detector and the second detector are approximately 10 keV. In other words, the radius of the hydrogen-containing material of the first detector and the second detector becomes a radius that allows the sensitivity peak to be set to approximately the lower limit value of the desired sensitivity range. With such a configuration, the neutron monitor device has sensitivity characteristics in the range of 10 keV to several hundreds keV.

Furthermore, a neutron monitor device of a present invention includes, a first detector which includes a first body including a spherical portion of a predetermined radius formed of a hydrogen-containing material, a first specimen containing Ga disposed at the center of the spherical portion, and a B layer provided around the first specimen, and a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer provided around the second specimen.

In this way, even if the Cd layer provided on the outer surface of the spherical portion is omitted, since the deflection of 10 keV or less to the positive side is small, a relatively accurate measurement of neutrons is possible.

Further, the neutron monitor device of the present invention includes a first detector which includes a first body including a spherical portion of a predetermined radius formed of a hydrogen-containing material, a first specimen containing Ga disposed at the center of the spherical portion, and a Cd layer provided around the first specimen; and a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer provided around the second specimen.

In this way, the periphery of the first specimen of the spherical portion of the first detector may be the Cd layer rather than the B layer. In this case, although vibration to the positive side occurs in the region of 10 keV or less, in general, the relatively accurate measurement of neutrons is performed. Further, the periphery of the first specimen and the second specimen may be the B layer.

DESCRIPTION OF EMBODIMENTS

Figure 1A:
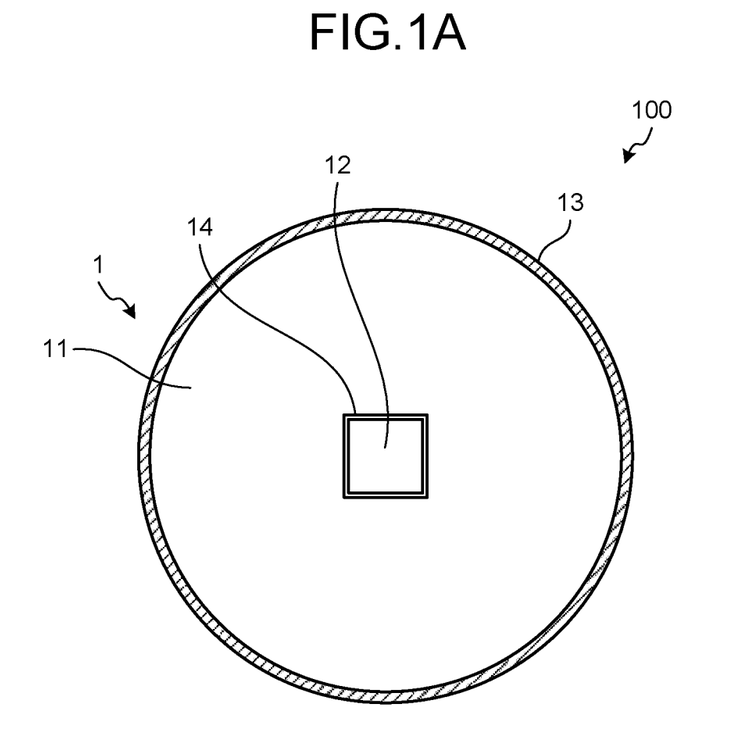
FIG. 1A is a plan view of a first detector of a neutron monitor device according to an embodiment of the present invention.
Figure 1B:
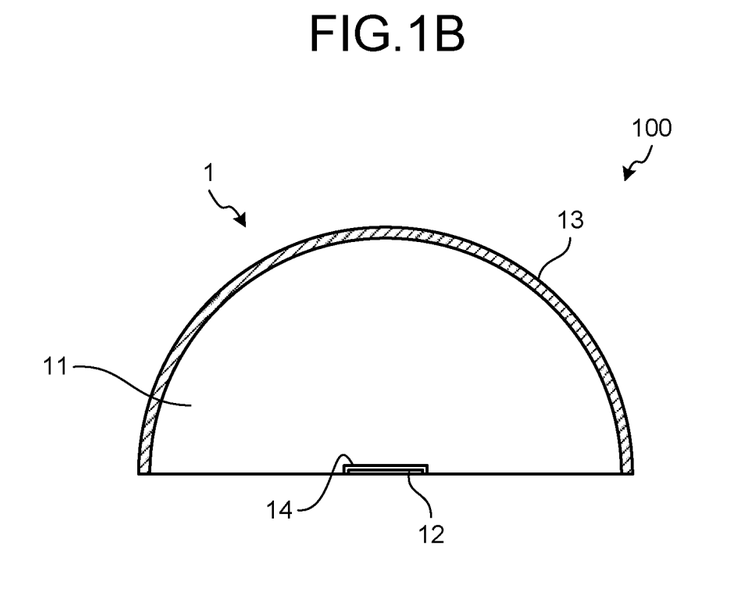
FIG. 1B is a cross-sectional view of the first detector of the neutron monitor device according to the embodiment of the present invention.
Figure 2A:
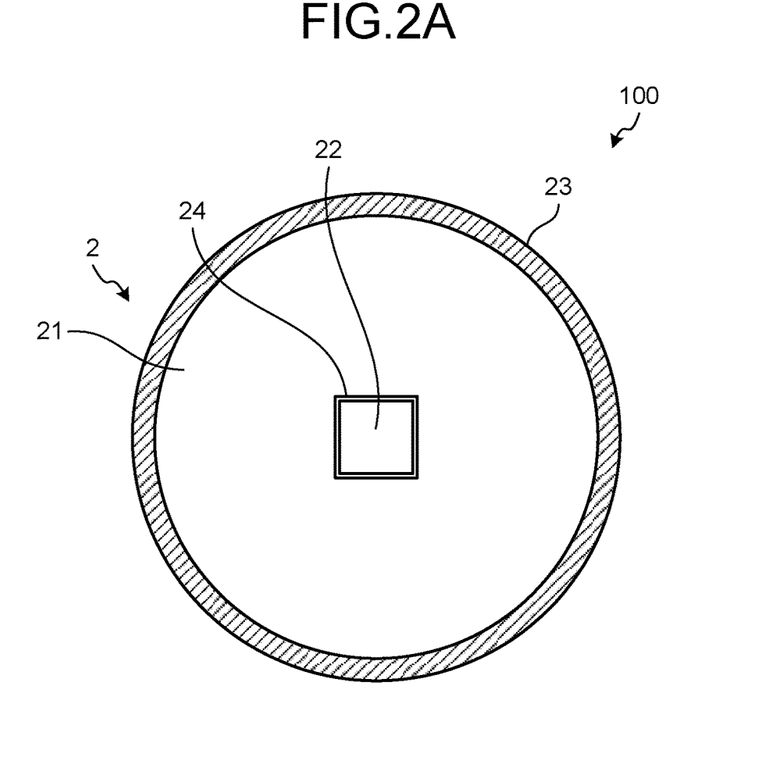
FIG. 2A is a plan view illustrating a second detector of the neutron monitor device according to the embodiment of the present invention.
Figure 2B:
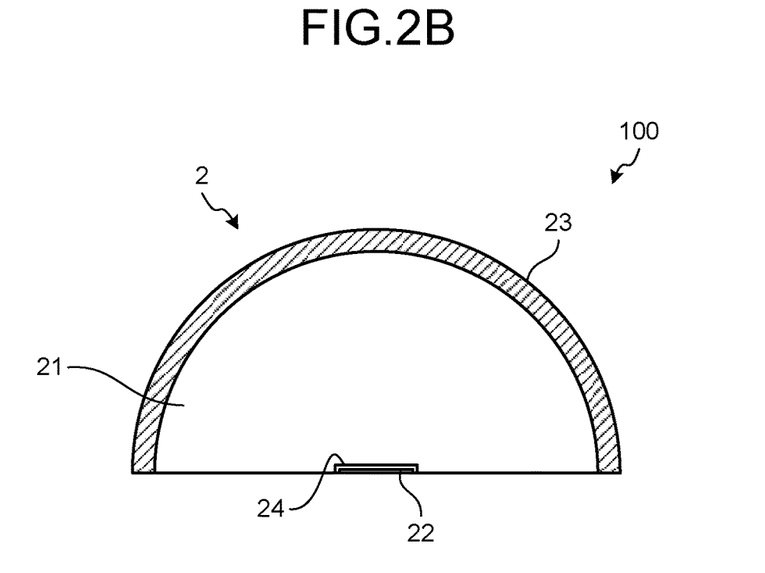
FIG. 2B is a cross-sectional view of a second detector of the neutron monitor device according to the embodiment of the present invention.

FIGS. 1A, 1B, 2A and 2B are block diagrams illustrating each part of a neutron monitor device according to the embodiment of the present invention. FIG. 1A is a plan view of a first detector of a neutron monitor device according to an embodiment of the present invention. FIG. 1B is a cross-sectional view of the first detector of the neutron monitor device according to the embodiment of the present invention. FIG. 2A is a plan view illustrating a second detector of the neutron monitor device according to the embodiment of the present invention. FIG. 2B is a cross-sectional view of a second detector of the neutron monitor device according to the embodiment of the present invention. A neutron monitor device 100 has a first detector 1 and a second detector 2. The first detector 1 and the second detector 2 have a configuration in which a hemispherical first body 11 and a second body 21 are formed by PE (polyethylene) that is a resin containing hydrogen, and a first specimen 12 and a second specimen 22 made of GaN and having a thin rectangle shape are disposed at the center of the first body 11 and the second body 21. The density of PE of the first body 11 and the second body 21 is, for example, 0.92 g/cm$^3$.

The first specimen 12 and the second specimen 22 have vertical and horizontal dimensions of 10 mm, and a thickness of 1 mm. The density is, for example, 6.15 g/cm$^3$. The first specimen 12 and the second specimen 22 are preferably disposed on the first body 11 and the second body 21 such that the surface is directed in a main irradiation direction of the neutrons.

In the first detector 1, the radius (thickness) of PE of the first body 11 is 31 mm, a Cd layer 13 is provided on the outer surface, and a B layer 14 is provided around the first specimen. The thickness (layer thickness) of the Cd layer 13 is 1.1 mm, and the thickness (layer thickness) of the B layer 14 is 1 mm. The B layer 14 is made of B$_4$C. Here, the periphery of the first specimen refers to the periphery of the first specimen 12, in other words, an internal space in which the first specimen 12 of the first body 11 made of PE is disposed (the same also applies to the second detector 2).

In the second detector 2, the radius (thickness) of PE is 27 mm, a B layer 23 is provided on the outer surface, and a Cd layer 24 is provided around the second specimen. The thickness (layer thickness) of the B layer 23 is 3.2 mm, and the thickness (layer thickness) of the Cd layer 24 is 0.5 mm. The B layer 23 is made of B$_4$C.

Figure 3:
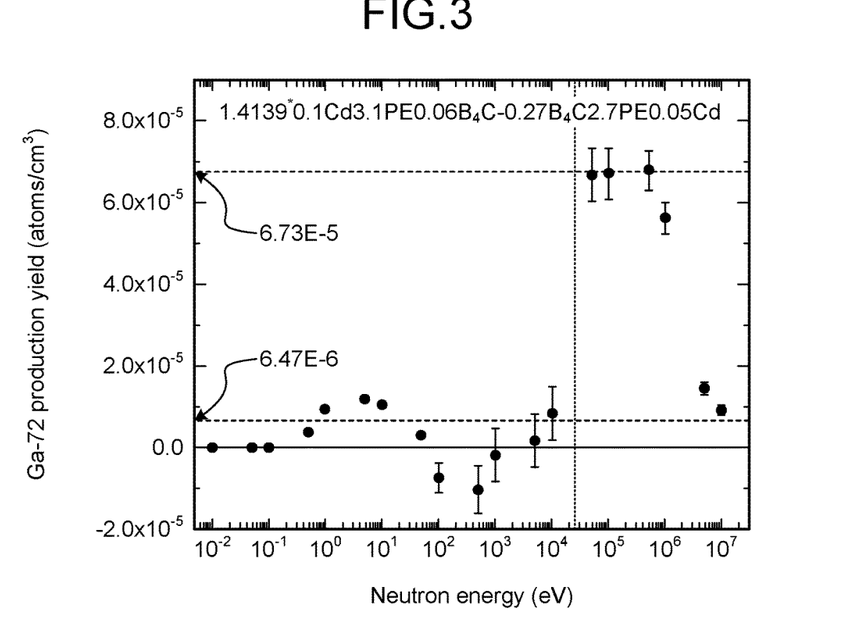
FIG. 3 is a graph illustrating the sensitivity characteristics of the case of subtracting the sensitivity of a second detector 2 from the sensitivity of a first detector 1.

In the present invention, the intensity of the epithermal neutrons is measured by a value obtained by subtracting the sensitivity of the second detector 2 from the sensitivity of the first detector 1. FIG. 3 illustrates the sensitivity characteristics in the case of subtracting the sensitivity of the second detector 2 from the sensitivity of the first detector 1. As indicated by the sensitivity characteristics, in the sensitivity obtained by a difference between the first detector 1 and the second detector 2 having the above configuration, the flat characteristics are obtained in the range of 10 keV to several hundreds keV. Further, an upper dotted line of FIG. 3 illustrates an average value of the sensitivity of 10 keV to 100 keV. A lower dotted line of FIG. 3 illustrates 25 keV line. A broken line of FIG. 3 illustrates an average value of the sensitivity of 10 keV or less.

Hereinafter, the reason for adopting the configuration of the neutron monitor device 100 will be described below. Since the neutrons are decelerated by the collision with the light nucleus, the neutrons are decelerated using the PE or water. It is preferable to use PE as a moderator of the neutron monitor device 100 in view of the easiness of molding.

Although it is not illustrated, the similar first body 11 and the second body 21 may be formed by enclosing water in a container of PE or the like. That is, since water as well as PE has capability of decelerating the neutrons, the shape and the volume of the container may be set to a thickness having the neutron deceleration capability equivalent to PE that forms the first body 11 and the second body 21.

Figure 4:
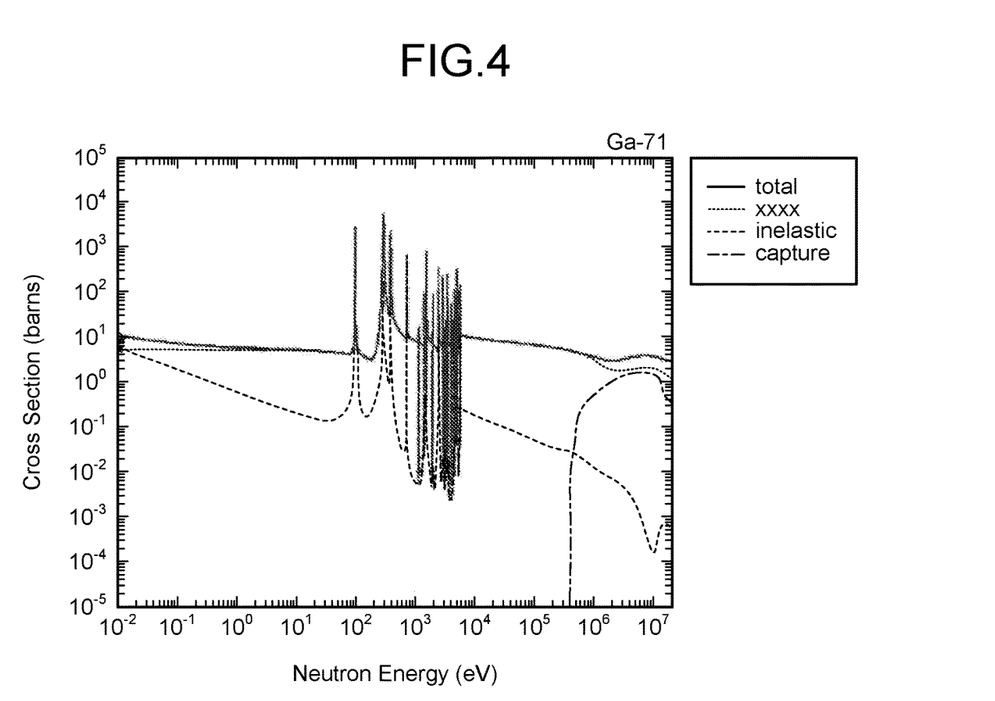
FIG. 4 is a graph illustrating the neutron detection reaction cross-sectional area of Ga.

GaN shows high sensitivity as the energy is low. The neutron reaction cross-sectional area of $^{71}$Ga is illustrated in FIG. 4. A chain line of a capture of FIG. 4 is a neutron detection reaction. As illustrated in FIG. 4, it is understood that the sensitivity of the region of low energy is proportional to 1/(velocity of neutrons). When there is no PE, there is sensitivity in the low-energy neutrons.

Here, it is assumed that the thickness of PE is increased, while increasing the incident energy. For example, in the case of E=1 MeV, when there is no PE, since the energy is too high, the sensitivity is lowered. Meanwhile, when the thickness of PE increases, since the neutrons reach the first specimen 12 and the second specimen 22 after decelerated, the sensitivity is enhanced. In the case of E=0.025 eV (thermal neutrons), since the energy is low, the sensitivity is high in a state in which there is no PE. When increasing the thickness of the PE, since the neutrons are shielded and neutrons do not reach the first specimen 12 and the second specimen 22, the sensitivity is lowered.

The sensitivity of the neutron monitor device 100 is determined by the aforementioned balance. That is, if the thickness of PE increases from 0 mm, since the neutrons are not decelerated at the beginning, there is sensitivity in the low energy. However, with an increase in thickness, the neutrons are decelerated, the sensitivity of low energy is lowered, and the sensitivity of high energy rises. That is, the peak of sensitivity is shifted to the high energy side with an increase in thickness of PE. Thus, it is possible to set the thickness of the PE such that the sensitivity is low in the low energy, the sensitivity is also low in the high energy, and the degree of deceleration is just desirable and the sensitivity rises in the intermediate energy.

Figure 5:
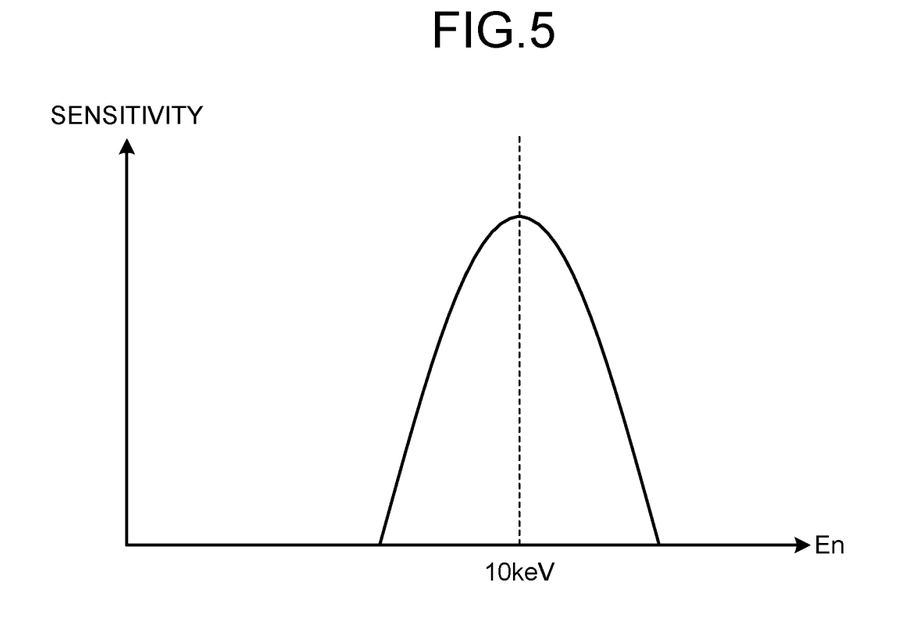
FIG. 5 is a graph illustrating the neutron detection sensitivity in the vicinity of 10 keV of the neutron monitor device.

In the present invention, the thickness of PE is set so that a peak of sensitivity is set to be 10 keV. FIG. 5 illustrates the neutron detection sensitivity in the vicinity of 10 keV. Further, a Cd layer is provided inside the first detector 1 and the second detector 2 (around the specimens 12 and 22) in advance. By doing so, since the neutrons of 100 eV or less are completely thermalized in the thickness of the PE, the sensitivities of the first detector 1 and the second detector 2 are set to 0, and it is possible to eliminate the sensitivity of the low-energy part as illustrated in FIG. 5.

Figure 6:
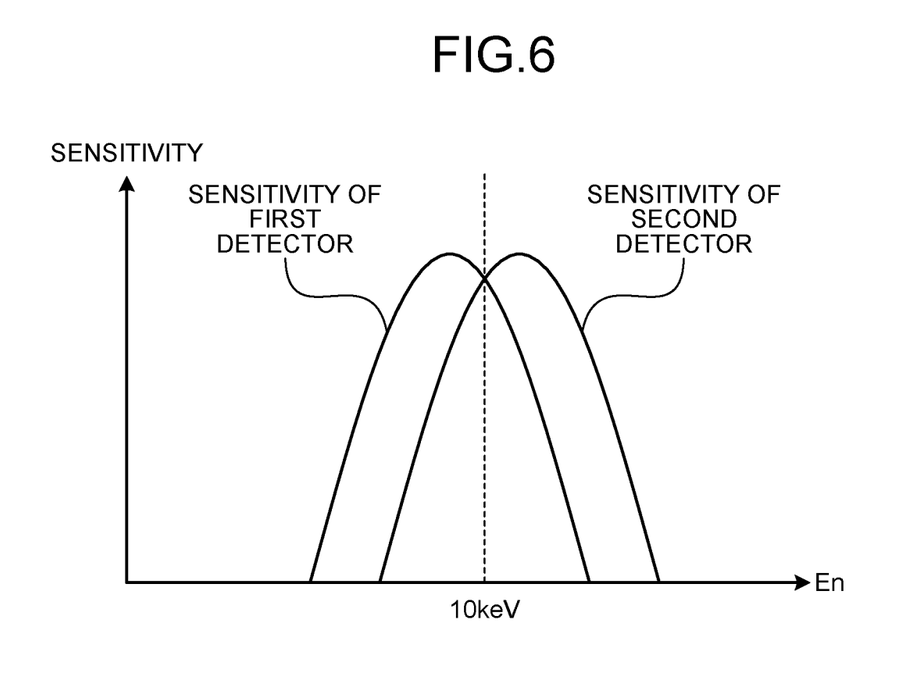
FIG. 6 is a conceptual diagram illustrating the sensitivity curves of the first detector and the second detector.

FIG. 6 is a conceptual diagram illustrating the sensitivity curves of the first detector 1 and the second detector 2. The thickness of PE of the first detector 1 of the neutron monitor device 100 is 31 mm, and the thickness of PE of the second detector 2 is 27 mm. The peaks of sensitivities of both of the first detector 1 and the second detector 2 are set to the vicinity of approximately 10 keV. As described above, since the sensitivity varies depending on the thickness of PE, the sensitivity curve of the first detector 1 (PE: 31 mm thickness) has curve characteristics that are shifted to the energy side higher than the second detector 2 (PE: 27 mm).

Further, as it will be described later, since an object of the present invention is to obtain flat characteristics in the sensitivity range of 10 keV to several hundreds keV, the thickness of PE of the first detector 1 and the thickness of PE of the second detector 2 may be respectively set so that the peak sensitivities of the first detector 1 and the second detector 2 are shifted in the vicinity of 10 keV which is a lower limit value of a desired sensitivity range. Further, it is preferred to suppress the errors of energy measurement of the neutrons to several percents. From this point of view, the thicknesses of PE of the first detector 1 and the second detector 2 can tolerate a change of about ±3 mm.

The configuration of the neutron monitor device in this state is as follows: (symbol "→" described below denotes the irradiation direction of the neutron, the same is applied, hereinafter).

Figure 7:
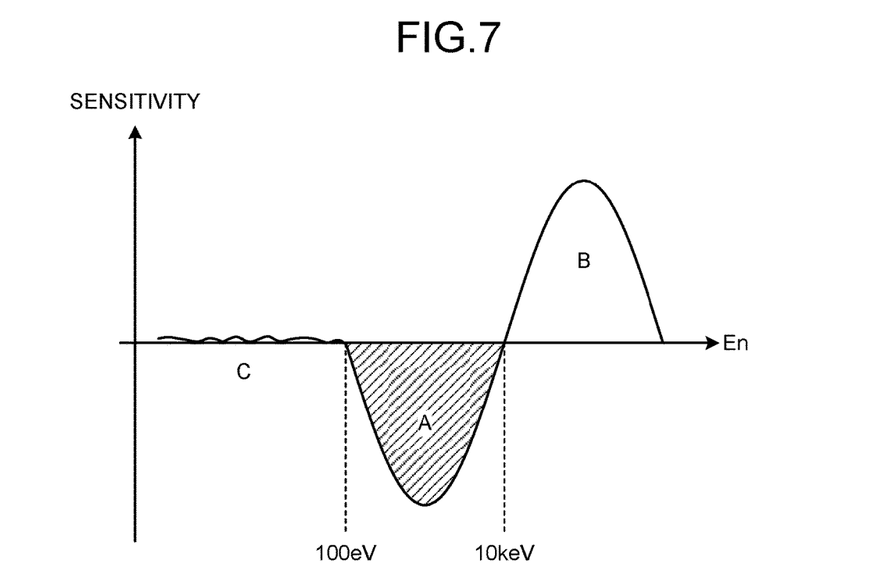
FIG. 7 is a graph illustrating a difference in the sensitivity characteristics between the first detector and the second detector.

First detector 1: 31 mm PE+Cd layer→first specimen
Second detector 2: 27 mm PE+Cd layer→second specimen Next, when subtracting the sensitivity of the second detector 2 from the sensitivity of the first detector 1, the characteristics as illustrated in FIG. 7 are obtained. Further, since the peak of the sensitivity can be set to a desired value by the thickness of the PE as described above, and the zero-cross point is set to 10 keV by the thickness of PE. Further, the B layer may be used in place of the Cd layer.

Figure 8:
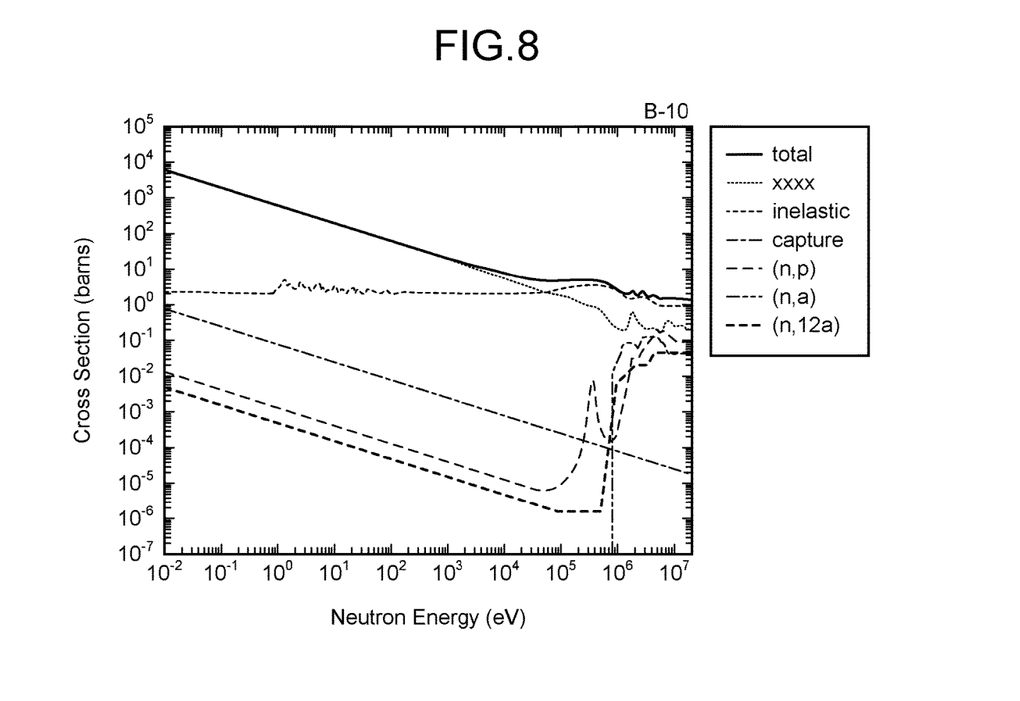
FIG. 8 is a graph illustrating the neutron capture cross-sectional area of B.
Figure 9:
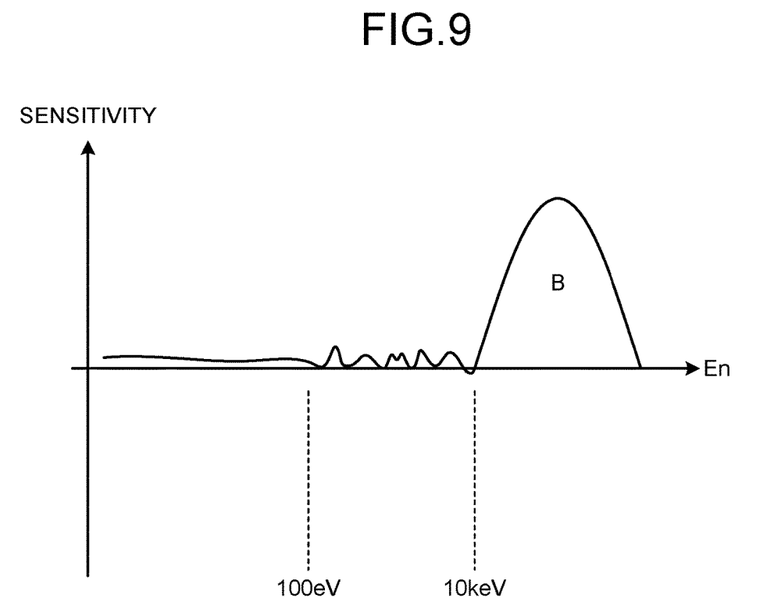
FIG. 9 is a graph illustrating a difference in the sensitivity characteristics between the first detector and the second detector.

By the above subtraction, even if the vibration is removed in the sensitivity characteristics, negative characteristics are present in the A region. This is because there is a difference between the sensitivities of the first detector 1 and the second detector 2 in 10 keV or less as illustrated in FIG. 6. Therefore, it is necessary to lower the sensitivity of the A region so as not to affect the sensitivity of the B region in the second detector 2. In the present invention, the neutrons of the intermediate energy are reduced by providing the B layer outside the second detector 2. The neutron capture cross-sectional area of B has favorable characteristics to reduce the neutrons of the intermediate energy, as illustrated in FIG. 8. By providing the B layer outside the second detector 2, as illustrated in FIG. 9, negative sensitivity characteristics of the A region are removed.

Figure 10:
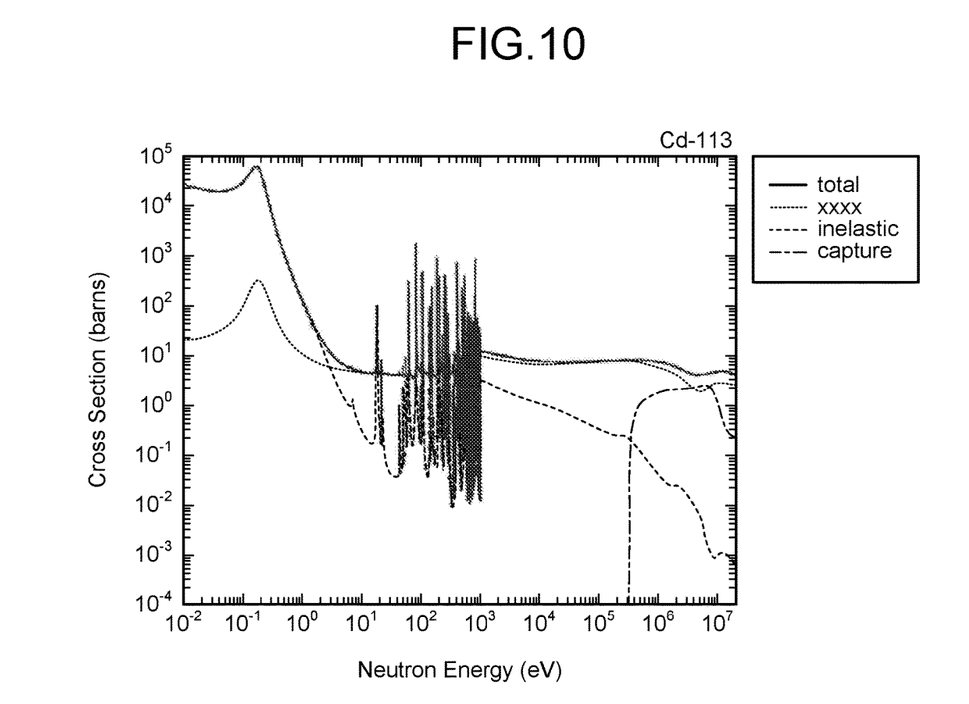
FIG. 10 is a graph illustrating the neutron capture cross-sectional area of the Cd layer.

The configuration of the neutron monitor device in this state is as follows:

First detector 1: 31 mm PE+Cd layer→first specimen
Second detector 2: B layer+27 mm PE+Cd layer→second specimen Even in this state, as illustrated in FIG. 9, since the vibration that is slightly offset to the positive side in 10 keV or less is observed, the vibration is removed. FIG. 10 illustrates a neutron capture cross-sectional area of the Cd layer. Although Cd and B are common in that thermal neutrons are absorbed and removed, Cd does not absorb the neutrons of the intermediate energy, whereas B absorbs the neutrons. Therefore, by changing the inner Cd layer of the first detector 1 to the B layer, the neutrons of the intermediate energy are removed. Thus, it is possible to remove the offset to the positive side and set the difference to zero.

The configuration of the neutron monitor device in this state is as follows:

First detector 1: 31 mm PE+B layer→first specimen
Second detector 2: B layer+27 mm PE+Cd layer→second specimen Further, in the case of a configuration in which the inner side of the detector is the B layer, the same operation and effect can be obtained by changing the inner layer B of the second detector 2 to the Cd layer.

Furthermore, the slight deflection to the positive side of the very low energy side remains. In order to remove this remaining deflection, the Cd layer is provided on the inner side of the first detector 1 to absorb the neutrons of very low energy. This makes it possible to prevent the neutrons of 10 keV or less from affecting the sensitivity characteristics.

Finally, the configuration of the neutron monitor device is as follows:

First detector 1: Cd layer+31 mm PE+B layer→first specimen

Second detector 2: B layer+27 mm PE+Cd layer→second specimen

The final sensitivity characteristics are as illustrated in FIG. 3. In this way, the flat characteristics were obtained in the sensitivity range of 10 keV or more. Before providing the Cd layer in the first detector 1, the sensitivity was not flat. However, by providing a combination of the Cd and B layers in both of the first detector 1 and the second detector 2, since it is possible to match the absorption characteristics, it is found that the sensitivity characteristics can be flattened.

The epithermal neutrons are measured by the neutron monitor device 100 having the above configuration. As illustrated in FIG. 3, since the flat characteristics are obtained in the sensitivity range of 10 keV to several hundreds keV, only the neutrons exceeding the epithermal neutrons have sensitivity. Specifically, the measurement is performed by the following procedure. The first specimen 12 and the second specimen 22 are installed in the neutron field to be measured. Both specimens are activated by neutrons of various kinds of energy. The radioactivity of the first specimen 12 and the second specimen 22 is analyzed to obtain the difference in the radioactivity between the first specimen 12 and the second specimen 22 as described above. Since this is determined by the sensitivity illustrated in FIG. 3, the difference becomes the contribution by the integral quantity of neutrons of 10 keV to several hundreds keV. With this method, it is possible to conversely achieve the measurement of only the epithermal neutrons.

In particular, since the neutrons of the region of 10 KeV or less are configured so as not to affect the sensitivity, it is possible to accurately measure the dose (intensity) of the epithermal neutrons.

Moreover, as in the configuration described below, it is possible to achieve a certain effect by providing the B layer on the outer side.

First detector 1: 31 mm PE+B layer→first specimen

Second detector 2: B layer+27 mm PE+Cd layer→second specimen

Furthermore, the same applies to the following configuration.

First detector 1: 31 mm PE+B layer→first specimen

Second detector 2: B layer+27 mm PE+B layer→second specimen

REFERENCE SIGNS LIST

100 NEUTRON MONITOR DEVICE
1 FIRST DETECTOR
2 SECOND DETECTOR
11 FIRST BODY
12 FIRST SPECIMEN
13 Cd LAYER
14 B LAYER
21 SECOND BODY
22 SECOND SPECIMEN
23 B LAYER
24 Cd LAYER

The invention claimed is:

1. A neutron monitor device comprising:
    a first detector which includes a first body including a spherical portion of a predetermined radius formed of a hydrogen-containing material, a first specimen containing Ga disposed at the center of the spherical portion, a Cd layer provided on an outer surface of the spherical portion, and a B layer provided around the first specimen; and
    a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer provided around the second specimen.

2. The neutron monitor device according to claim 1, wherein the hydrogen-containing material of the first detector and the second detector is made of PE, and the radius of the spherical portion of the first detector and the radius of the spherical portion of the second detector are set so that the peak sensitivity of each of the first detector and the second detector is shifted in the vicinity of a lower limit value of a desired sensitivity range.

3. A neutron measurement method comprising:
    placing the first detector and the second detector of the neutron monitor device according to claim 1 in an irradiation region of neutrons; and
    after the irradiation of neutrons, measuring the neutron intensity from a difference in sensitivity between the first detector and the second detector.

4. A neutron monitor device comprising:
    a first detector which includes a first body including a spherical portion of a predetermined radius formed of a hydrogen-containing material, a first specimen containing Ga disposed at the center of the spherical portion, and a B layer provided around the first specimen; and
    a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer provided around the second specimen.

5. The neutron monitor device according to claim 4, wherein the hydrogen-containing material of the first detector and the second detector is made of PE, and the radius of the spherical portion of the first detector and the radius of the spherical portion of the second detector are set so that the peak sensitivity of each of the first detector and the second detector is shifted in the vicinity of a lower limit value of a desired sensitivity range.

6. A neutron monitor device comprising:
    a first detector which includes a first body including a spherical portion of a predetermined radius formed of a hydrogen-containing material, a first specimen containing Ga disposed at the center of the spherical portion, and a Cd layer or a B layer provided around the first specimen; and a second detector which includes a second body that is formed of a hydrogen-containing material and includes a spherical portion having a radius different from the radius of the spherical portion of the first detector, a second specimen containing Ga disposed at the center of the spherical portion, a B layer provided on the outer surface of the spherical portion, and a Cd layer or a B layer provided around the second specimen.

7. The neutron monitor device according to claim 6, wherein the hydrogen-containing material of the first detector and the second detector is made of PE, and the radius of the spherical portion of the first detector and the radius of the spherical portion of the second detector are set so that the peak sensitivity of each of the first detector and the second detector is shifted in the vicinity of a lower limit value of a desired sensitivity range.

* * * * *